(12) United States Patent
LaBute et al.

(10) Patent No.: US 10,671,440 B2
(45) Date of Patent: Jun. 2, 2020

(54) RESOURCE USAGE PREDICTION FOR CLUSTER PROVISIONING

(71) Applicant: Workday, Inc., Pleasanton, CA (US)

(72) Inventors: Montiago Xavier LaBute, Oakley, CA (US); Teng Qu, Berkeley, CA (US); James Michael Stratton, Danville, CA (US)

(73) Assignee: Workday, Inc., Pleasanton, CA (US)

( * ) Notice: Subject to any disclaimer, the term of this patent is extended or adjusted under 35 U.S.C. 154(b) by 135 days.

(21) Appl. No.: 15/887,879

(22) Filed: Feb. 2, 2018

(65) Prior Publication Data

US 2019/0243686 A1 Aug. 8, 2019

(51) Int. Cl.
*G06F 9/50* (2006.01)
*G06F 16/172* (2019.01)

(52) U.S. Cl.
CPC ........... *G06F 9/505* (2013.01); *G06F 9/50* (2013.01); *G06F 9/5005* (2013.01); *G06F 16/172* (2019.01); *G06F 9/5011* (2013.01); *G06F 2212/602* (2013.01); *G06F 2212/6024* (2013.01); *G06F 2212/6026* (2013.01)

(58) Field of Classification Search
None
See application file for complete search history.

(56) References Cited

U.S. PATENT DOCUMENTS

| | | |
|---|---|---|
| 6,941,365 B2 | 9/2005 | Sirgany |
| 7,757,214 B1 | 7/2010 | Palczak |
| 8,032,875 B2 | 10/2011 | Kosche |
| 8,185,909 B2 | 5/2012 | Sigal |
| 8,429,097 B1 | 4/2013 | Sivasubramanian |
| 8,589,549 B1 | 11/2013 | Vermeulen |
| 8,850,449 B2 | 9/2014 | Hiltunen |
| 10,409,642 B1 | 9/2019 | Tang |
| 2005/0055426 A1* | 3/2005 | Smith ............... H04L 67/2847 709/219 |
| 2012/0246638 A1 | 9/2012 | He |
| 2013/0086273 A1 | 4/2013 | Wray |
| 2013/0212277 A1 | 8/2013 | Bodik |
| 2016/0070601 A1* | 3/2016 | Yamamoto ............ G06F 9/5088 718/105 |
| 2016/0301624 A1* | 10/2016 | Gonzalez .............. G06F 9/5083 |
| 2017/0214632 A1 | 7/2017 | Ravi |
| 2019/0325370 A1 | 10/2019 | Das |

OTHER PUBLICATIONS

Vinicius Petrucci, Energy-Efficient Thread Assignment Optimization for Heterogeneous Multicore Systems, University of Michigan, ACM Transactions on Embedded Computing Systems, vol. 14, No. 1, Article 15, Publication date: Jan. 2015. (Year: 2015).

* cited by examiner

*Primary Examiner* — Qing Yuan Wu
(74) *Attorney, Agent, or Firm* — Van Pelt, Yi & James LLP

(57) ABSTRACT

A system for provisioning resources includes an input interface and a processor. The input interface is configured to receive a time series of past usage data. The past usage data comprises process usage data and instance usage data. The processor is configured to determine an upcoming usage data based at least in part on the time series of the past usage data, and provision a computing system according to the upcoming usage data.

17 Claims, 14 Drawing Sheets

US 10,671,440 B2

RESOURCE USAGE PREDICTION FOR CLUSTER PROVISIONING

BACKGROUND OF THE INVENTION

Cluster computing systems comprise a set of computers configured to process portions of a computing job. Computers may be added to the cluster or removed from the cluster as the demand changes. The resource load on a computer cluster for processing database system jobs can be extremely spiky, as large jobs come and go. When a request for a large job is received, preparing the cluster to perform the large job can take a great deal of time, as computers may need to be added to the cluster to perform processing at the desired rate, and data for processing may need to be transferred to the worker machines. This slowdown lowers the overall efficiency of the cluster and its ability to process large jobs on demand

BRIEF DESCRIPTION OF THE DRAWINGS

Various embodiments of the invention are disclosed in the following detailed description and the accompanying drawings.

DETAILED DESCRIPTION

Figure 1A:
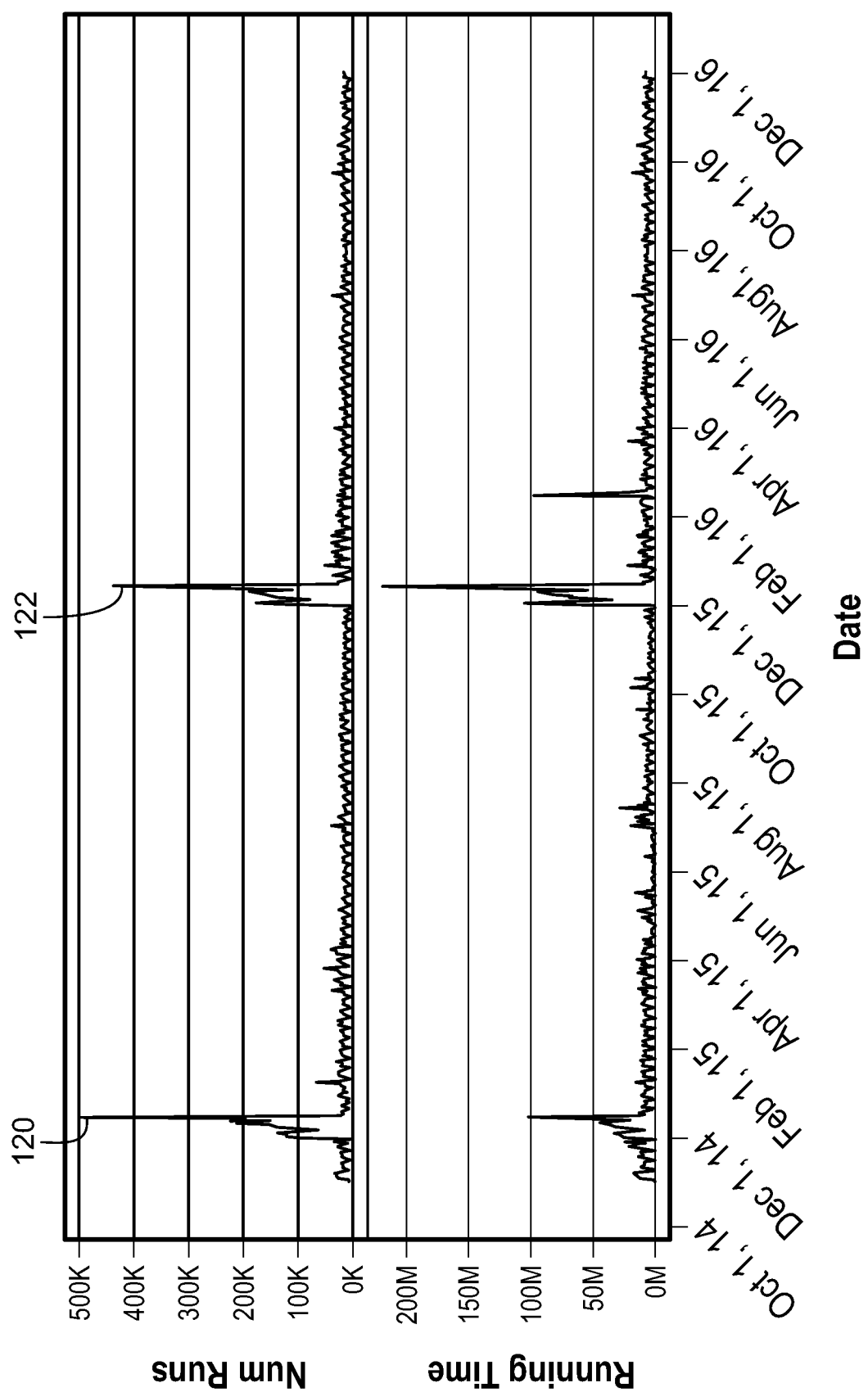
FIG. 1A is a set of graphs illustrating an embodiment of number of runs and running time of processes on a date.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for provisioning resources comprises an input interface configured to receive a time series of past usage data, wherein the past usage data comprises process usage data (e.g., task or job process usage data) and instance usage data (e.g., data object instance usage data), and a processor configured to determine an upcoming usage data based at least in part on the time series of the past usage data, and provision a computing system according to the upcoming usage data. In some embodiments, the system for provisioning resources comprises a memory coupled to the processor and configured to provide the processor with instructions.

A system for resource usage prediction for cluster provisioning is disclosed. The system for resource usage prediction receives past data for use in making a resource usage prediction. The past data comprises process usage data (e.g., what processes were run at what time, what processing resources were required for each process, etc.) and instance data (e.g., what data object instances were required for each process). The past data comprise a time series of past usage data (e.g., a series of measurements of usage data over a period of time). A long series of past data may be required to produce a high quality resource usage prediction (e.g., measurements over months or years in order to capture sufficient seasonality). A time series forecasting algorithm (e.g., regression, machine learning, neural networks, etc.) is used to predict future usage based on the past usage. Predictions for future usage based on the past usage are made on a regular basis (e.g., every hour, every day, every week, etc.). Each time a prediction is made, the cluster is provisioned based on the predicted future usage. Provisioning the cluster comprises determining the required resources indicated by the future usage (e.g., the future usage indicates a set of jobs that will be executed during a given time period, the required resources for the jobs comprise a set of cluster computers able to execute the full set of jobs in the desired time period, as well as the data instances required to be loaded onto the cluster computers) and preparing the resources (e.g., activating the computer systems and preloading them with data instances) in advance of when they are needed.

The system for resource usage prediction determines data instances to load onto the cluster computers by determining data instances accessed by the jobs of the predicted future usage. The system for resource usage prediction does not access the content of the data instances (e.g., the stored data), but rather just the patterns of how frequently they were accessed. In the event that the data instances accessed by the jobs of the predicted future usage comprise more data than can be stored by a cluster computer, data is reduced by partitioning data instances into smaller groups by collecting "similar" (i.e., processed by largely the same tasks/jobs) data instances together and loading only those data instances.

The computer system is improved by more efficiently provisioning resources (e.g., processing resources and data resources) for a cluster in order to execute tasks (e.g., especially periodically executed tasks).

FIG. 1A is a set of graphs illustrating an embodiment of number of runs and running time of processes on a date. In the example shown, the top graph shows the number of runs for all benefits tasks from October 2014 to December 2016. Note that the number of runs peaks during the month of December in both 2014 and 2015 (e.g., peak 10 and peak 12). Similarly, for the running time of the tasks, the running time peaks in December in both 2014 and 2015.

In some embodiments, given the historical data on workloads, the set of resources needed to process these workloads can be simulated (e.g., even at the read or update thread level). The individual thread requirements can be simulated separately. For each time bin (e.g., 5 minutes), a task queue can be created from the data, the task ordering can be randomly shuffled and a Monte Carlo simulation of workload parallelization can be performed. The number of threads can be increased until the execution duration can be within a required time. (e.g., 30 minutes). The simulations are repeated over different task queue orderings. The maximum number of threads is taken as the predicted number of threads needed.

Figure 1B:
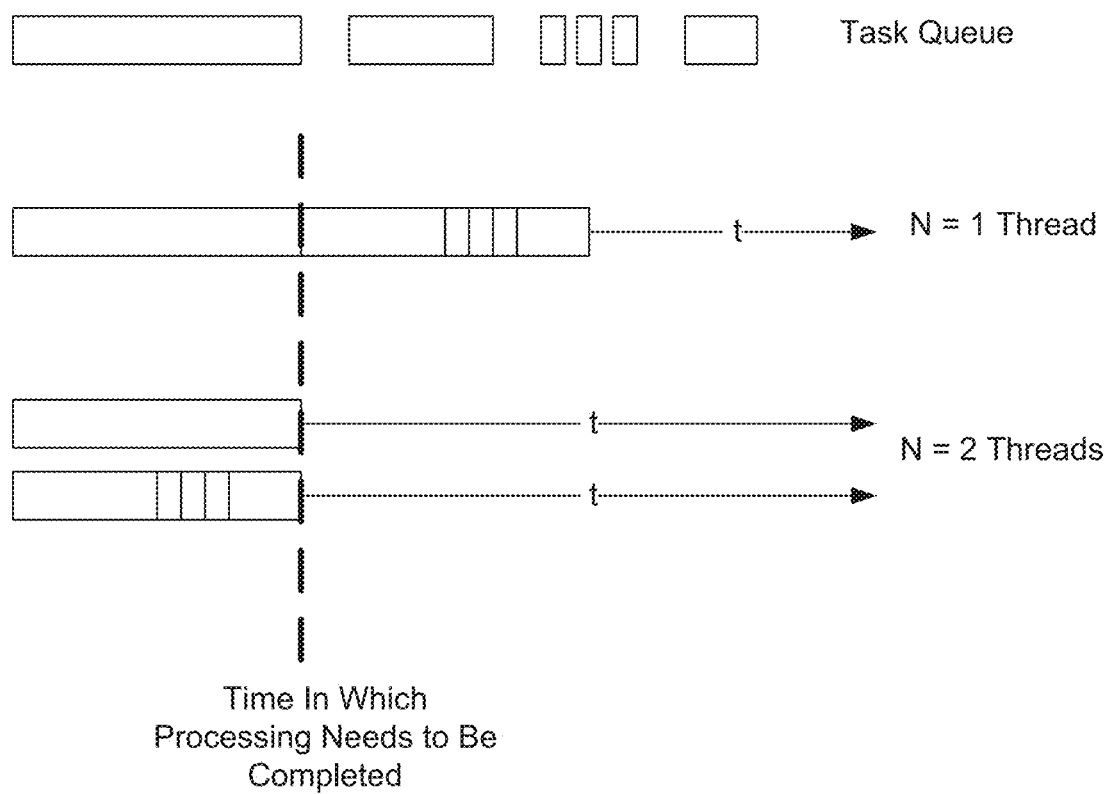
FIG. 1B is a diagram illustrating task queue and the model of multi-threaded processing.

FIG. 1B is a diagram illustrating task queue and the model of multi-threaded processing. In the example shown, a task queue includes a number of tasks, represented by the computational time needed to complete them. In this example, the processing time is reduced by parallelizing the workload out on two threads instead of one. The use of two threads enables the tasks to be processed within the end-to-end "wall-clock" time requirement.

Figure 1C:
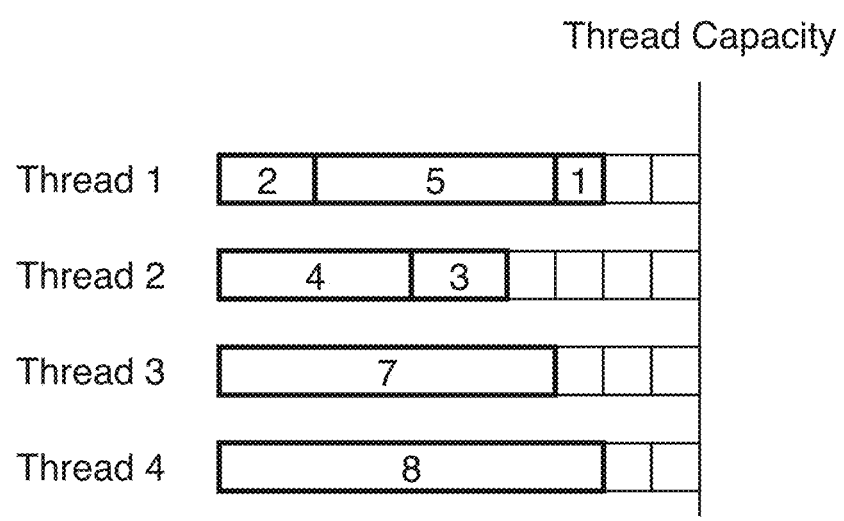
FIG. 1C is a diagram illustrating an embodiment of a first fit packing algorithm.

FIG. 1C is a diagram illustrating an embodiment of a first fit packing algorithm. In some embodiments, the first fit packing algorithm is used by a required threads determiner. In the example shown, the first fit packing algorithm is used to pack tasks into a set of threads. Tasks are arranged in an ordered task queue. In the example shown, the ordered task queue comprises threads of size 2, 5, 4, 7, 1, 3, and 8, and they are to be packed into a set of threads, each of capacity 10 (Note: the units here are milliseconds). The packing algorithm is to place each task in the first available thread with room for it. The first task, of size 2, is placed in thread 1, leaving a remaining capacity of 8 in thread 1. The second task, of size 5, is placed in thread 1, leaving a remaining capacity of 3 in thread 1. The third task, of size 4, cannot be placed in thread 1, so it is placed in thread 2, leaving a remaining capacity of 6 in thread 2. The fourth task, of size 7, cannot be placed in thread 1 or 2, so it is placed in thread 3, leaving a remaining capacity of 3 in thread 3. The fifth task, of size 1, is placed in thread 1, leaving a remaining capacity of 2 in thread 1. The sixth task, of size 3, cannot be placed in thread 1, so it is placed in thread 2, leaving a remaining capacity of 3 in thread 2. The seventh and final task, of size 8, cannot be placed in thread 1, 2, or 3, so it is placed in thread 4, leaving a remaining capacity of 2 in thread 4.

Figure 1D:
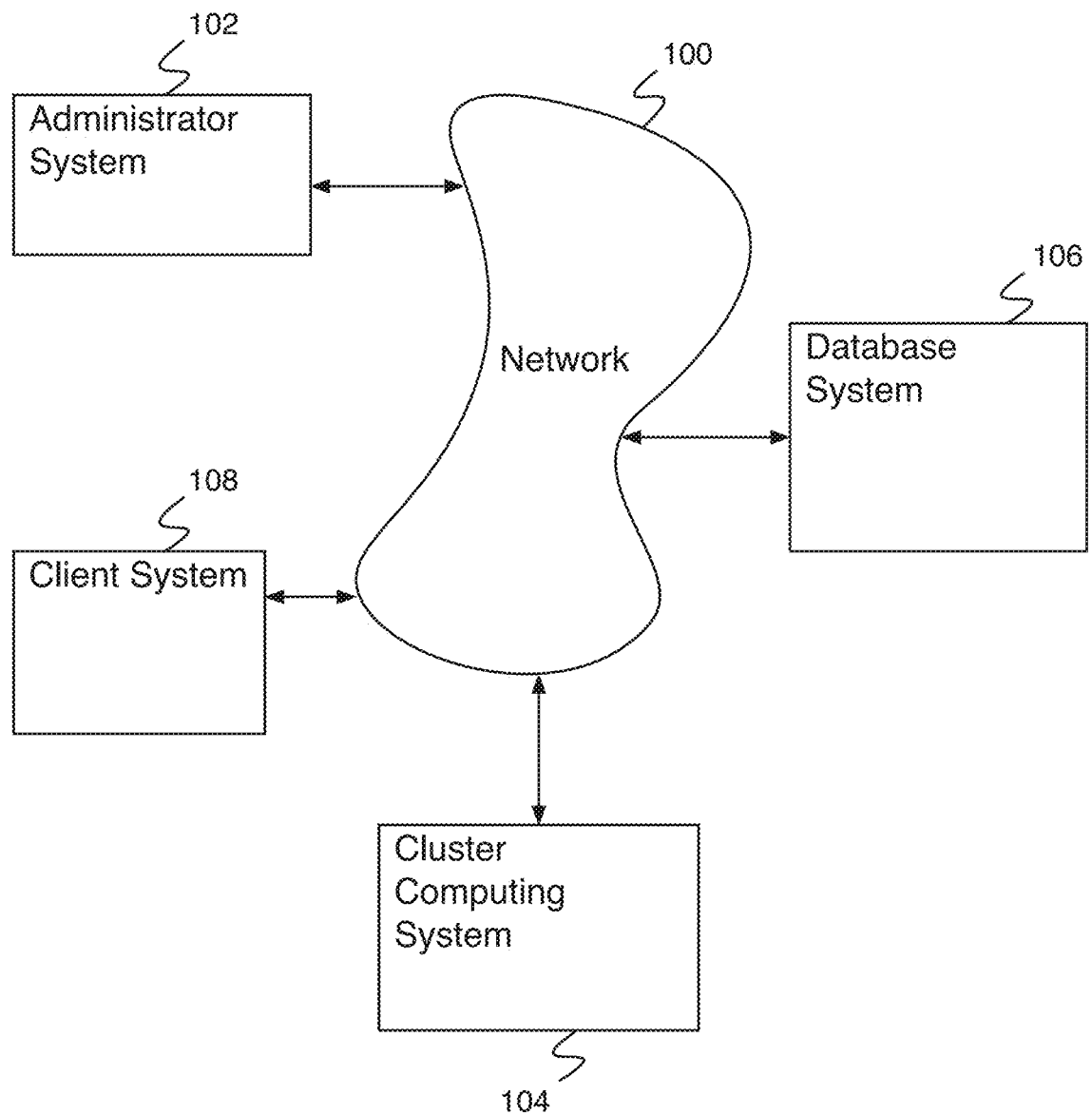
FIG. 1D is a block diagram illustrating an embodiment of a network system.

FIG. 1D is a block diagram illustrating an embodiment of a network system. In some embodiments, the network system of FIG. 1D comprises a system for resource usage prediction for cluster provisioning. In the example shown, cluster computing system 104 receives request to perform processing of jobs over time from client system 108. In some embodiments, cluster computing system 104 receives requests from a plurality of client systems similar to client system 108. Cluster computing system 104 receives the requests and determines how to breakdown the job for processing by the cluster. In some cases, cluster computing system 104 includes a master system and a plurality of worker systems. The master system divides the computing job into a plurality of cluster computing tasks, assigns cluster computing tasks to one or more worker systems, receives cluster computing task results from worker systems, and assembles cluster computing task results. Cluster computing system 104 receives, along with the request, the code required to run the processing job as well as a pointer to the data for the processing job. In some cases, the data is retrieved from a database system or other storage system (e.g., database system 106). Cluster computing system 104 additionally comprises a cluster provisioning system that receives a time series of past usage data (e.g., a series of data indicating past using of cluster computing system 104), determines an upcoming usage data based at least in part on the time series of past usage data (e.g., using a time series prediction algorithm), and provisions the cluster system according to the upcoming usage data (e.g., requesting worker systems to come online, indicating to transfer data to the worker systems, etc.). After the processing job has been completed, a measurement is made as to how well the prediction for compute resources and data fared and the measurement data is stored and used to refine a next prediction.

In various embodiments, network 100 provides a means for communicating between administrator system 102, cluster computing system 104, client system 108, and database system 106 and comprises one or more of the following: a local area network, a wide area network, a wired network, a wireless network, the Internet, an intranet, a storage area network, or any other appropriate communication network. Administrator system 102 enables an administrator to maintain cluster computing system 104. Administrator system 102 comprises a system for executing administrator commands, for configuring database system 106 or cluster computing system 104, for querying database system 106 or cluster computing system 104, etc. Database system 106 comprises a storage system for storing data (e.g., client data, administrator data, etc.).

Figure 2:
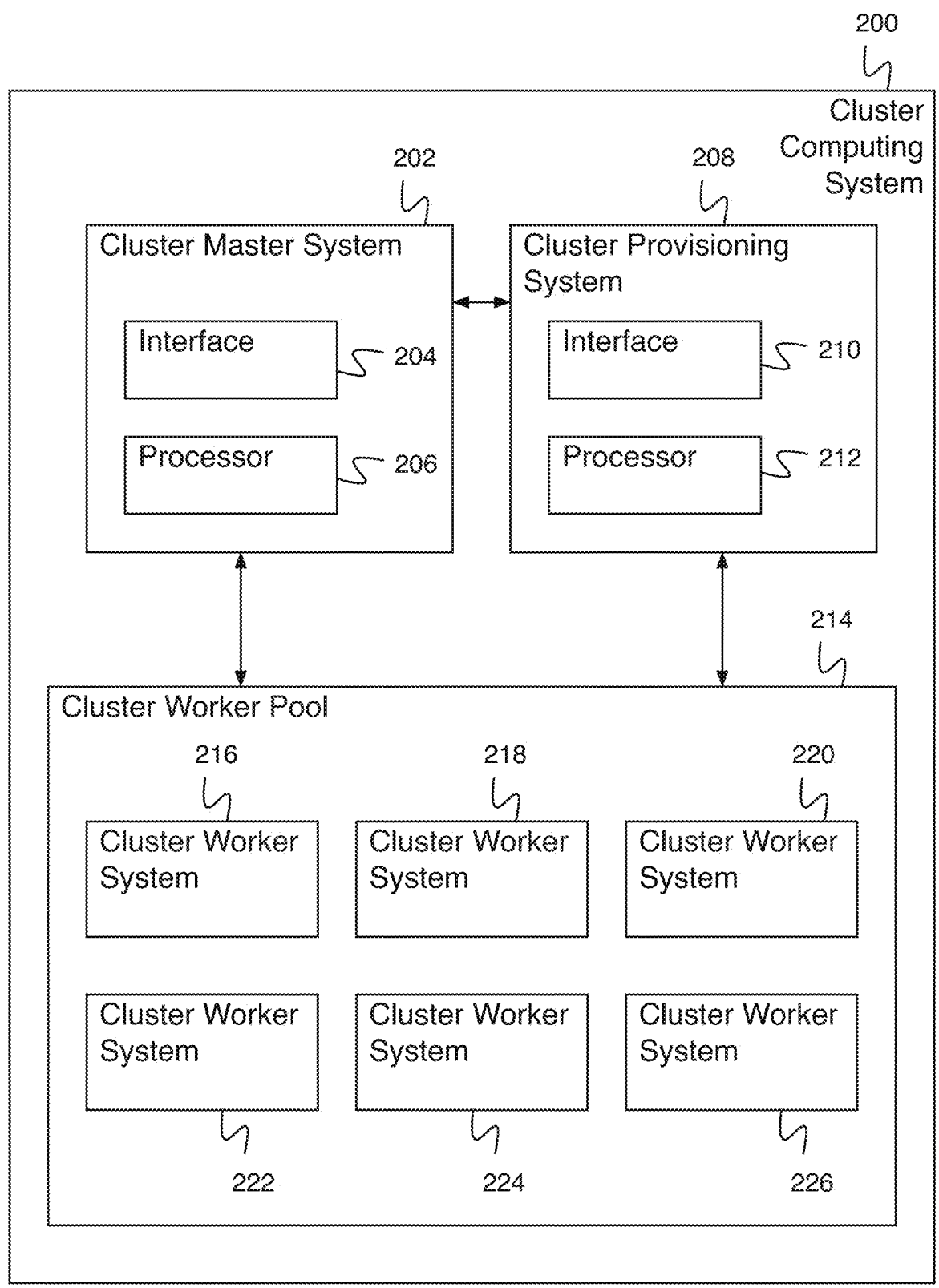
FIG. 2 is a block diagram illustrating an embodiment of a cluster computing system.

FIG. 2 is a block diagram illustrating an embodiment of a cluster computing system. In some embodiments, cluster computing system 200 comprises cluster computing system 104 of FIG. 1D. In the example shown, cluster computing system 200 comprises cluster master system 202, cluster provisioning system 208, and cluster worker pool 214. Cluster master system 202 interacts with outside systems and receives job requests, breaks job into tasks, and farms them out to workers. The tasks and accompanying code and data are provided to workers (e.g., a cluster worker system in cluster worker pool 214) to be executed. In the event that sufficient worker resources are not available, cluster master system 202 provisions new workers to process the tasks. Cluster master system 202 also receives output from processing of the task and assembles the output. The assembled output is provided to requestor system (e.g., a client system).

Cluster master system 202 comprises interface 204 (e.g., for interacting with other systems—for example, a client system or a database system, or cluster worker systems of cluster worker pool 214 (e.g., cluster worker system 216, cluster worker system 218, cluster worker system 220, cluster worker system 222, cluster worker system 224, and cluster worker system 226) and processor 206 (e.g., for processing data). Cluster worker pool 214 comprises any appropriate number of cluster worker systems, and the number of cluster worker systems can change dynamically as desired. Cluster computing system 200 additionally comprises cluster provisioning system 208. Cluster provisioning system 208 comprises interface 210 (e.g., for interacting with other systems) and processor 212 (e.g., for processing data). Cluster provisioning system 208 comprises a system for receiving a time series of previous usage data, for determining upcoming usage data based at least in part on the time series of previous usage data, for provisioning a computing system according to the upcoming usage data, etc. Cluster provisioning system 208 determines an appropriate cluster worker pool (e.g., an appropriate configuration of cluster worker pool 214) for an upcoming processing demand, and requests to activate an appropriate number of cluster worker systems and preload the cluster worker systems with an appropriate set of data instances for the upcoming processing demand. Cluster provisioning system 208 determines upcoming usage data at a regular interval (e.g., once an hour, once a day, once a week, etc.). Cluster provisioning system 208 determines upcoming usage data with a predetermined granularity (e.g., determines the upcoming usage during five minute intervals of the upcoming day, during 30 minute intervals of the upcoming day, during two hour intervals of the upcoming day, etc.).

Figure 3A:
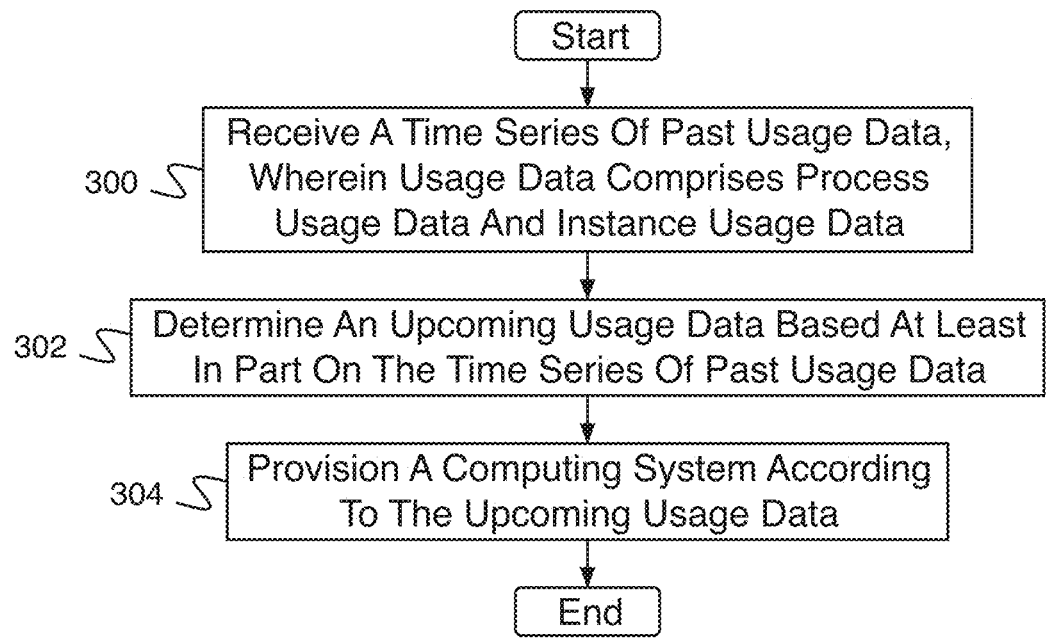
FIG. 3A is a flow diagram illustrating an embodiment of a process for provisioning resources.

FIG. 3A is a flow diagram illustrating an embodiment of a process for provisioning resources. In some embodiments, the process of FIG. 3 is executed by cluster provisioning system 208 of FIG. 2. In the example shown, in 300, a time series of past usage data is received, wherein usage data comprises process usage data and instance usage data. The time series comprises usage data measured at regular intervals (e.g., every minute, every five minutes, every ten minutes, every hour, etc.) over an extended period of time (e.g., a month, six months, two years, etc.). Process usage data comprises a set of processes running at each of the intervals. Instance usage data comprises set of data instances accessed by processes of the set of processes. In 302, an upcoming usage data is determined based at least in part on the time series of past usage data. Upcoming usage data comprises predicted usage data for an upcoming period of time (e.g., the next hour, the next day, the next week, etc.). In 304, a computing system is provisioned according to the upcoming usage data. For example, a computing cluster is prepared to have the resources necessary for the predicted upcoming usage data.

In some embodiments, an upcoming usage data is determined based at least in part on the time series of past usage data at a regular interval (e.g., once a month, one a week, once a day, once an hour, etc.).

Figure 3B:
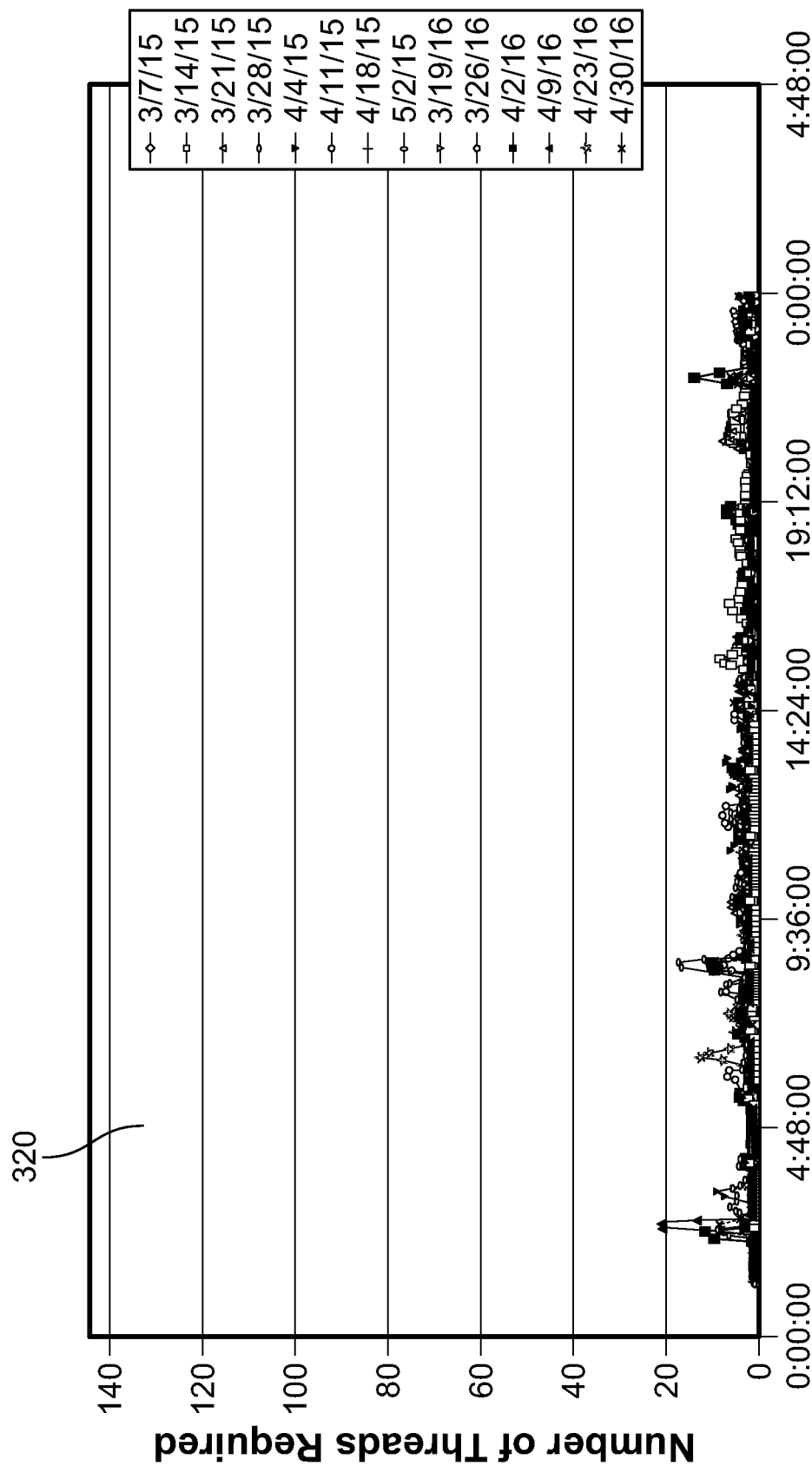
FIG. 3B is a graph illustrating an embodiment of process data.

FIG. 3B is a graph illustrating an embodiment of process data. In the example shown in plot 320, the number of threads required by the system to keep up with the processing load is shown. The number of threads is plotted versus the hours of the day. In this case, there are a number of days (e.g., 14 different days) displayed that are each a Saturday. The usage for these days is generally low (e.g., a maximum of about 20 threads and typically fairly level usage of about 10 threads or less).

Figure 3C:
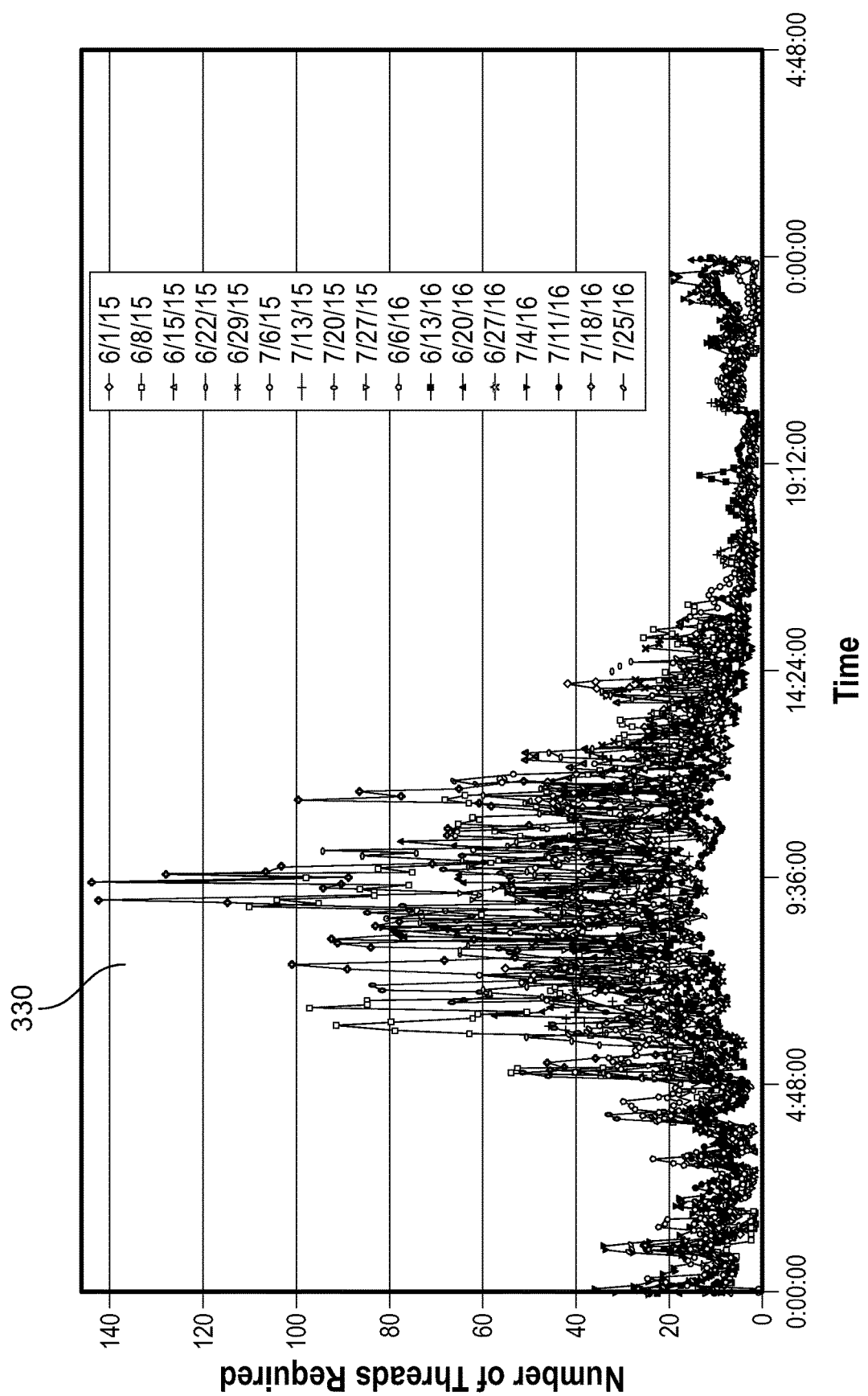
FIG. 3C is a graph illustrating an embodiment of process data.

FIG. 3C is a graph illustrating an embodiment of process data. In the example shown in plot 330, the number of threads required by the system to keep up with the processing load is shown. The number of threads required is plotted versus the hours of the day. In this case, there are a number of days (e.g., 17 different days) displayed that are each a Monday. The usage for these days is peaked (e.g., a maximum of about 140 threads and peaked around noon).

Figure 3D:
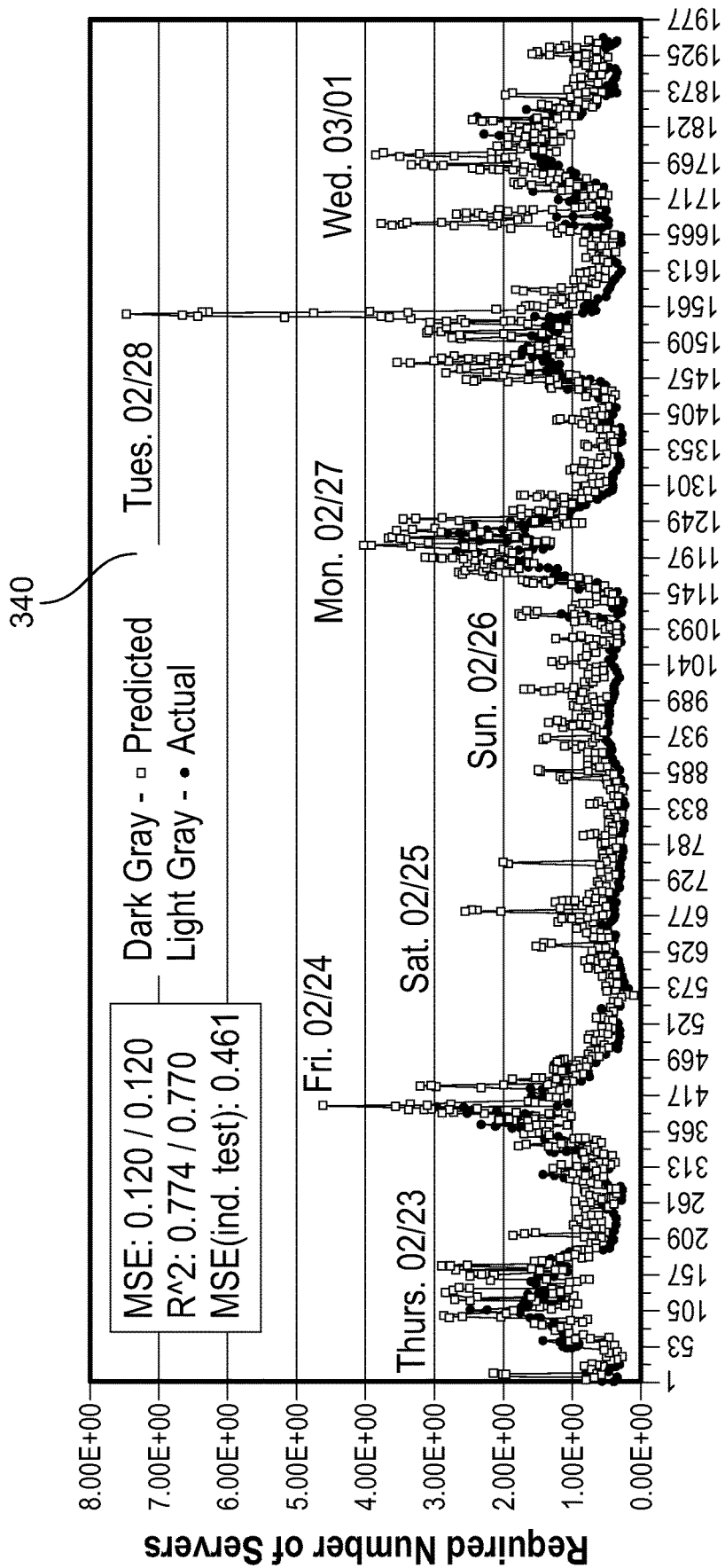
FIG. 3D is a graph illustrating an embodiment of process data.

FIG. 3D is a graph illustrating an embodiment of process data. In the example shown in plot 340, the number of servers predicted by the system to keep up with the processing load along with the actual load is plotted for a number of days. The predicted usage is shown as being a little smoother and generally a bit lower than the actual usage requirement for 7 days (e.g., Thursday 2/23, Friday 2/24, Saturday 2/25, Sunday 2/26, Monday 2/27, Tuesday 2/28, and Wednesday 3/1).

Figure 4A:
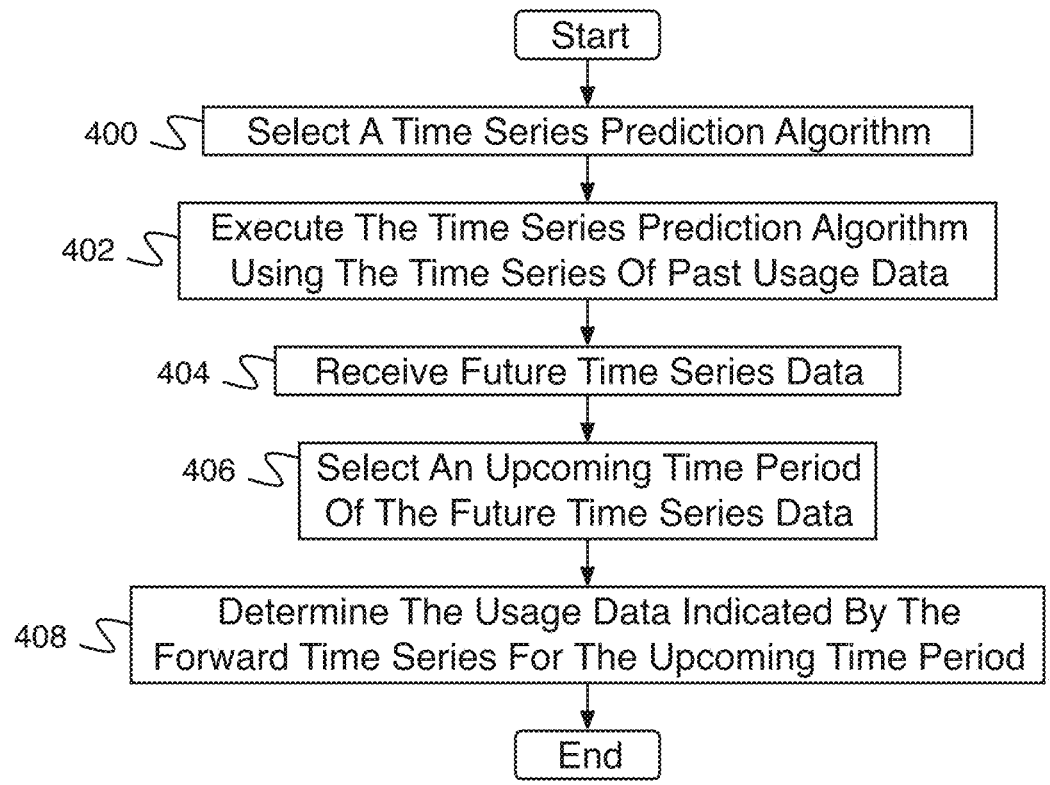
FIG. 4A is a flow diagram illustrating an embodiment of a process for determining an upcoming usage data based at least in part on the time series of past usage data.

FIG. 4A is a flow diagram illustrating an embodiment of a process for determining an upcoming usage data based at least in part on the time series of past usage data. In some embodiments, the process of FIG. 4 implements 302 of FIG. 3A in the example shown, in 400, a time series prediction algorithm is selected. For example, the time series prediction algorithm is selected from a set of time series prediction algorithms. In some embodiments, the set of time series prediction algorithms includes one or more of the following: autoregressive moving average, machine learning, linear time series prediction algorithms, nonlinear time series prediction algorithms, neural networks, genetic algorithms, etc. In some embodiments, Monte Carlo simulations produce the number of threads required to process historical task workloads. Also, since it is known that there are N threads per server the number of threads can be divided by N to convert the result to a number of servers. In 402, the time series prediction algorithm is executed using the time series of past usage data. In 404, future time series data is received. For example, the future time series data is received as output from the time series prediction algorithm. In 406, an upcoming time period is selected. For example, the upcoming time period is selected as, for example, a day, an upcoming week, a month, a quarter, a year, etc. In 408, the usage data indicated by the forward time series for the upcoming time period is determined. For example, the usage data is predicted for the upcoming time period and includes the processing usage as well as data usage.

Figure 4B:
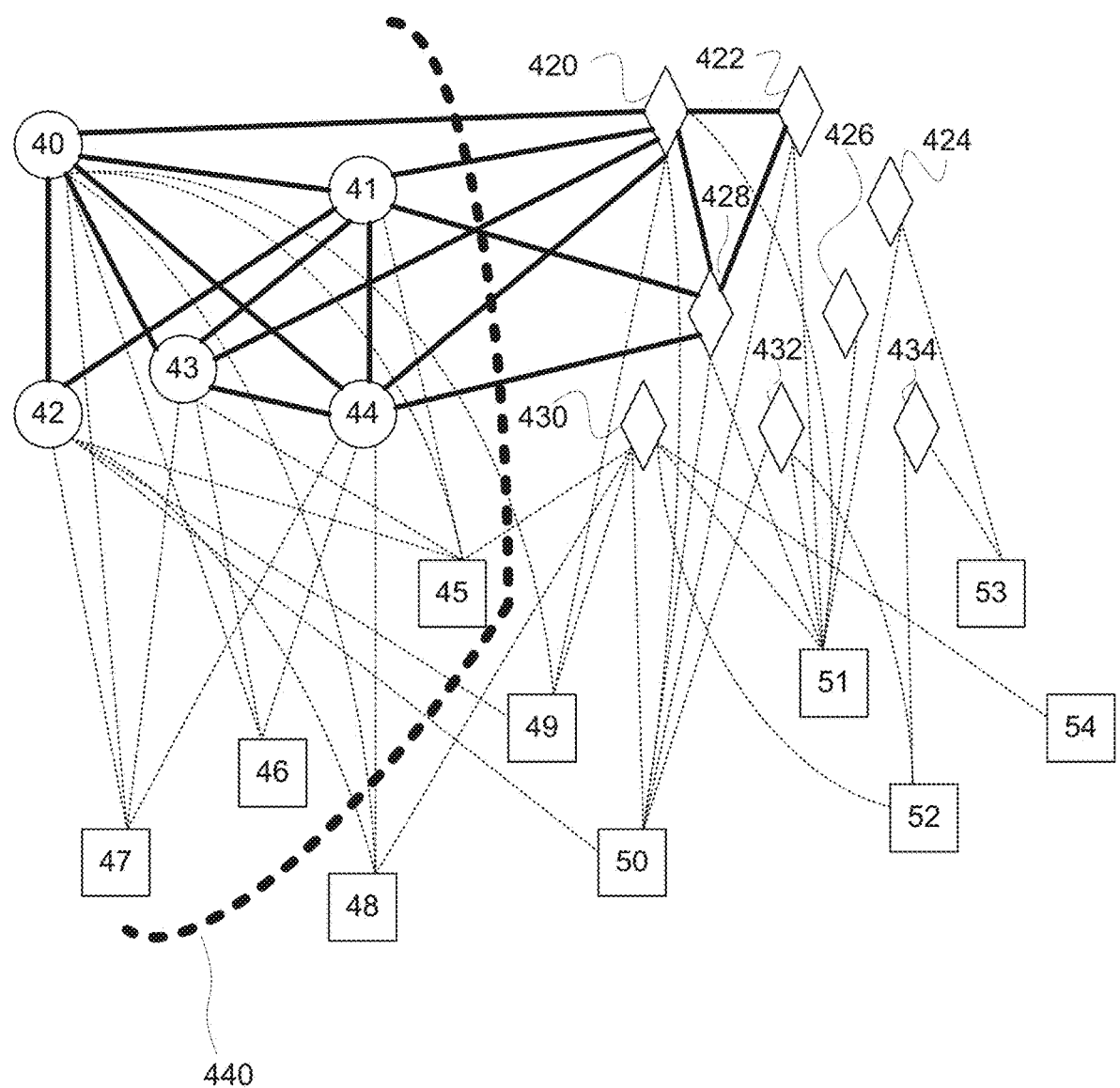
FIG. 4B is a diagram illustrating the data partitioning algorithm.

FIG. 4B is a diagram illustrating an embodiment of a data segregation. In the example shown, a bi-partite task-class graph where there are two different types of nodes: tasks (e.g., circle node 40, circle node 41, circle node 42, circle node 43, circle node 44, and diamond node 420, diamond node 422, diamond node 424, diamond node 426, diamond node 428, diamond node 430, diamond node 432, and diamond node 434) and classes (e.g., square node 45, square node 46, square node 47, square node 48, square node 49, square node 50, square node 51, square node 52, square node 53, and square node 54). An edge (e.g., a lightly dotted line) is drawn between a task node and a class node in the event that the task associated with the task node accessed the class associated with the class node at least once. In some embodiments, there is a weight associated with an edge that is proportional to the number of times that the task associated with the task node accessed the class associated with the class node. The graph then has heavy black lines added between task nodes with tasks that tend to run close together in time (i.e., a co-occurrence task-task graph is displayed). More concretely (a weight is associated with the edge between task X and task Z, where the weight is proportional to the number of times the two tasks are run within, say 1 minute of each other). A graph partitioning algorithm is performed over this total graph and this graph is used to determine which classes are put on particular nodes, servers, etc. with the tasks being the anticipated workloads. For example, in the example shown, the task nodes and classes are partitioned with border 440 and the tasks and classes on the left side of border 440 are placed on a first server or in a first partition, whereas the tasks and classes on the right side of border 440 are placed on a second server or in a second partition.

Figure 5:
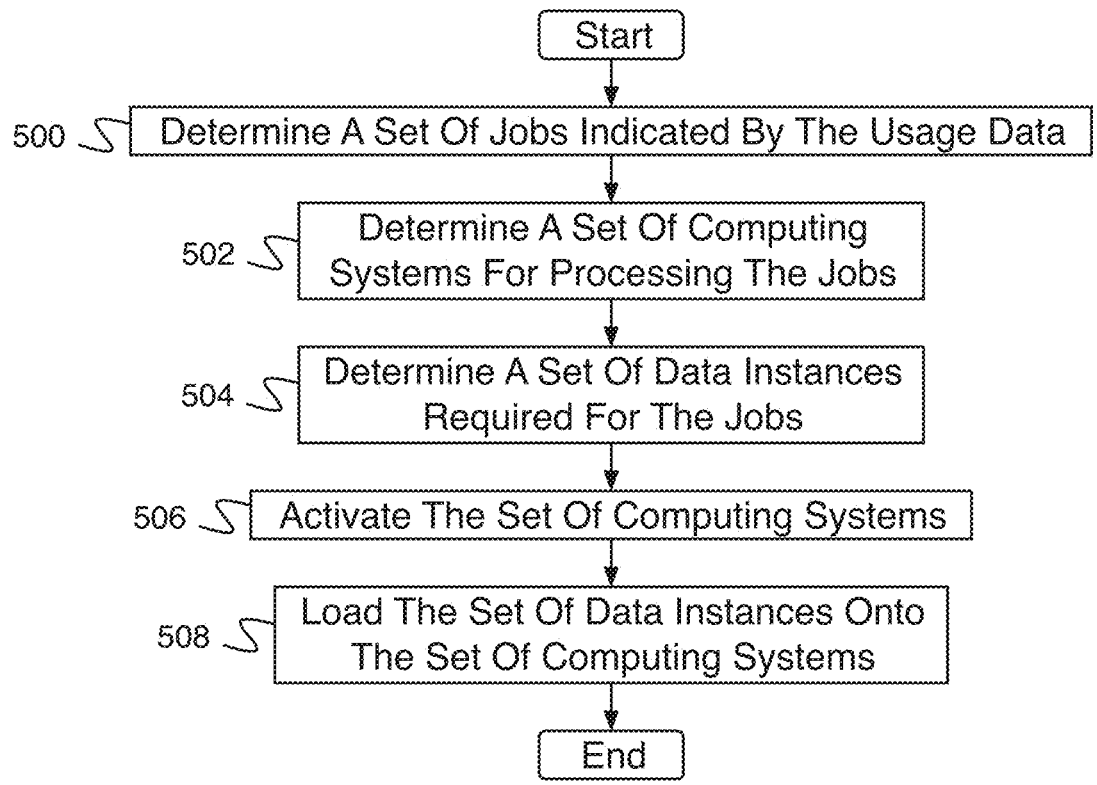
FIG. 5 is a flow diagram illustrating an embodiment of a process for provisioning a computing system according to upcoming usage data.

FIG. 5 is a flow diagram illustrating an embodiment of a process for provisioning a computing system according to upcoming usage data. In some embodiments, the process of FIG. 5 implements 304 of FIG. 3. In the example shown, in 500, a set of jobs indicated by the usage data is determined. The usage data comprises a set of jobs at each of a set of times. Determining a set of jobs indicated by the usage data comprises determining the set of jobs indicated by the usage data at a next time, determining the set of jobs indicated by the usage data at all times, determining the set of jobs indicated by the usage data for each time, etc. In 502, a set of computing systems for processing the jobs is determined. For example, computers, servers, worker machines, virtualized computing systems, or other computing resources are determined sufficient to process the jobs in the desired period of time. The Monte Carlo simulation is used to convert the task workload requirements to a resource requirement (i.e., the number of threads/servers needed to accomplish that workload in a given amount of time as well as the data instances that are required to be loaded). In some embodiments, a computing system is associated with each job of the set of jobs at each of the set of times. In 504, a set of data instances required for the jobs is determined. For example, the set of data instances required in the processing of the predicted jobs is determined using the data segregation method shown in FIG. 4B. In 506, the set of computing systems is activated. For example, the computing resources predicted to be needed are brought online as part of a computing cluster. In various embodiments, activating the set of computing systems comprises activating a computer system, activating a virtual computer system, selecting a computer system server type, activating a plurality of systems, or activating any other appropriate computing systems. In 508, the set of data instances is loaded onto the set of computing systems. In some embodiments, a computing system stores a set of instances associated with each job of the set of jobs at each of the set of times. In some embodiments, a common set of instances is stored by each computing system of the set of computing systems.

Figure 6:
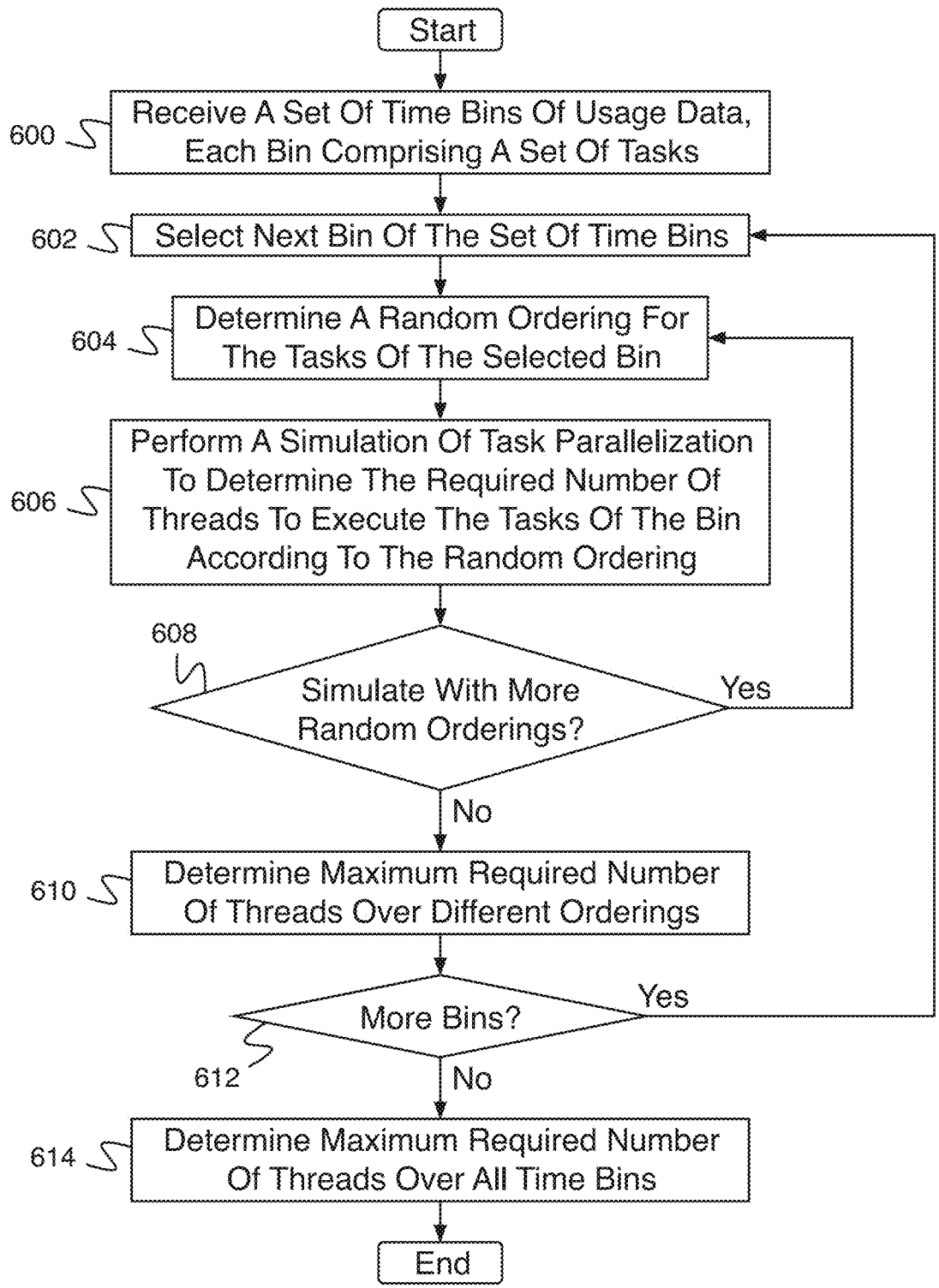
FIG. 6 is a flow diagram illustrating an embodiment of a process for determining a set of computing systems for processing tasks.

FIG. 6 is a flow diagram illustrating an embodiment of a process for determining a set of computing systems for processing tasks. In some embodiments, the process of FIG. 6 implements 502 of FIG. 5. In the example shown, in 600, a set of time bins of data is received, each bin comprising a set of tasks. In 602, a next bin of the set of time bins is selected. In some embodiments, the next bin comprises the first bin. In 604, a random ordering for the tasks of the selected bin is determined. In 606, a simulation of task parallelization is performed to determine the required number of threads to execute the tasks of the bin according to the random ordering. The simulation of task parallelization comprises a set of simulations of task parallelization including an increasing number of threads, until a simulation comprising enough threads to complete the tasks of the bin in the desired period of time is performed. In some embodiments, the simulation comprises a Monte Carlo (e.g., randomized) simulation. In 608, it is determined whether to simulate with more random orderings. A predetermined number of random orderings are used (e.g., 5, 10, 20, etc.). In the event it is determined to simulate with more random orderings, control passes to 604. In the event it is determined not to simulate with more random orderings, control passes to 610. In 610, the maximum required number of threads over different orderings is determined. In 612, it is determined whether there or more bins. For example, it is determined whether there is another bin of the set of time bins that needs to be processed. In the event it is determined that there are more bins, control passes to 602. In the event it is determined that there are not more time bins, control passes to 614. In 614, the maximum required number of threads over all time bins is determined. For example, the maximum required number of threads over all time bins is determined in order to give a recommended number of threads for the time period subtended by the bins received in 600 (e.g., a single day). In some cases, this is not done and the threads per bin is the data used.

Figure 7:
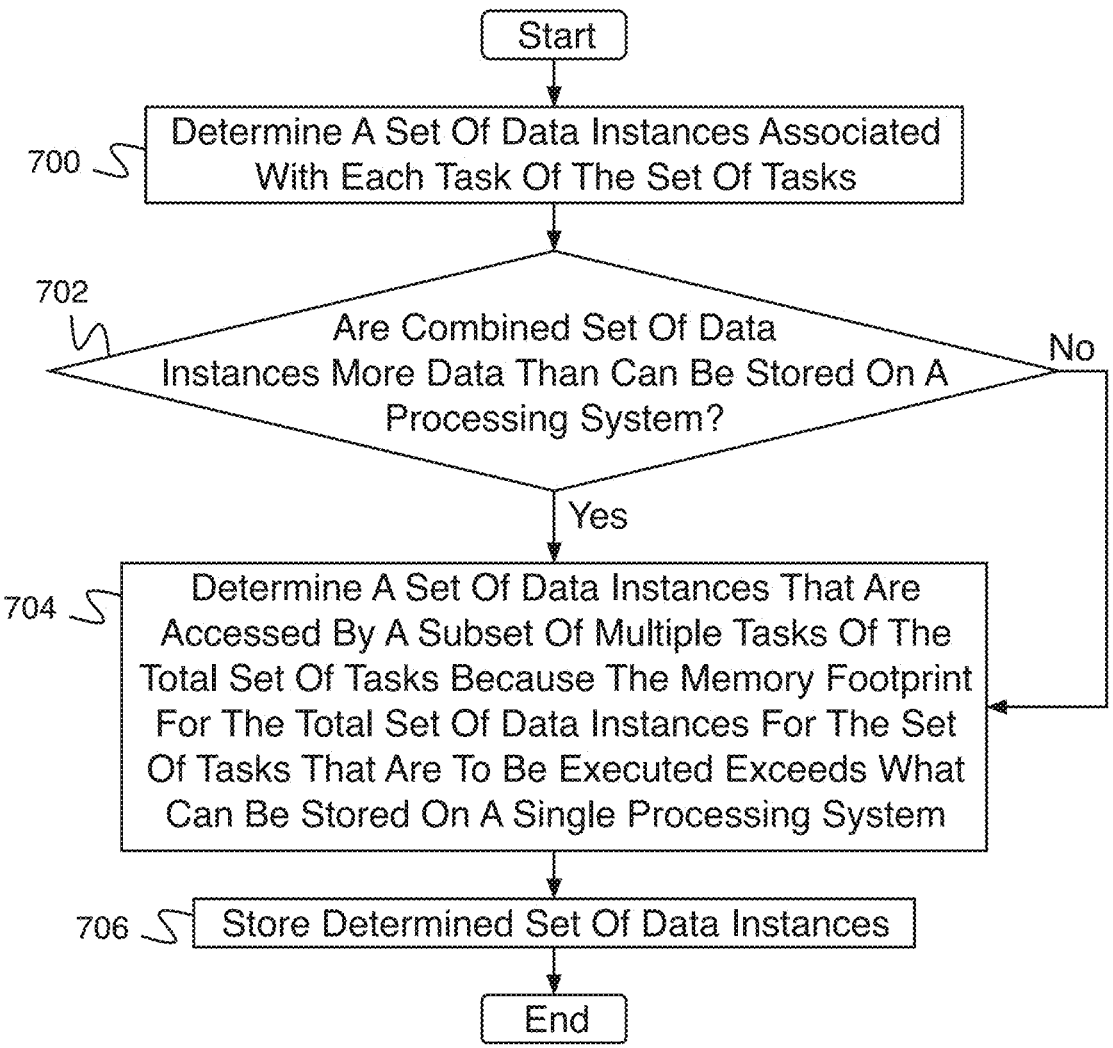
FIG. 7 is a flow diagram illustrating an embodiment of a process for determining a set of data instances required for a set of tasks.

FIG. 7 is a flow diagram illustrating an embodiment of a process for determining a set of data instances required for a set of tasks. In some embodiments, the process of FIG. 7 implements 504 of FIG. 5. In the example shown, in 700, a set of data instances associated with each task of the set of tasks is determined. In 702, it is determined whether the combined set of data instances are more data than can be stored on a processing system. In the event it is determined that the combined set of data instances are not more data than can be stored on a processing system, control passes to 706. In the event it is determined that the combined set of data instances are more data than can be stored on a processing system, control passes to 704. In 704, a set of data instances that are accessed by a subset of multiple tasks of the total set of tasks is determined because the memory footprint for the total set of data instances for the set of tasks that are to be executed exceeds what can be stored on a single processing system. Therefore, the set of data instances is partitioned into smaller chunks over multiple servers, nodes, Java Virtual Machines, etc. using the process detailed above regarding FIG. 4B. The historical patterns of how the total set of tasks access the data instances and the temporal patterns of how closely tasks are run together in time, together, are used to construct a graph which is then partitioned using pre-existing graph partitioning algorithms. The result of this process generates subgroups of data instances, where each subgroup is then placed on its own server. An example is that in the event that a customer is trying to run a large Report, the workload for that one Report and the subset of data needed to run that Report might be placed on its own server, node, Java Virtual Machine as a result of the graph partitioning process. Consequently, large workloads can be isolated to their own processing system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for provisioning resources, comprising:
a processor; and a memory coupled with the processor, wherein the memory is configured to provide the processor with instructions which when executed cause the processor to:
  receive a time series of past usage data, wherein the past usage data comprises process usage data and instance usage data;
  determine an upcoming usage data based at least in part on the time series of the past usage data; and
  provision a computing system according to the upcoming usage data, wherein provisioning the computing system according to the upcoming usage data comprises loading a set of data instances onto the computing system.

2. The system of claim 1, wherein determining the upcoming usage data based at least in part on the time series of the past usage data comprises processing the past usage data without accessing stored instance data.

3. The system of claim 1, wherein determining the upcoming usage data based at least in part on the time series of the past usage data comprises determining a cluster of related data instances.

4. The system of claim 1, wherein provisioning the computing system according to the upcoming usage data comprises activating a computer system.

5. The system of claim 1, wherein provisioning the computing system according to the upcoming usage data comprises activating a virtual computer system.

6. The system of claim 1, wherein provisioning the computing system according to the upcoming usage data comprises selecting a computer system server type.

7. The system of claim 1, wherein the upcoming usage data comprises a set of jobs at each of a set of times.

8. The system of claim 7, wherein a computer system is associated with each job of the set of jobs at each of the set of times.

9. The system of claim 8, wherein the computing system stores a set of data instances associated with each job of the set of jobs at each of the set of times.

10. The system of claim 9, wherein a common set of data instances is stored by each computer system of a set of computer systems.

11. The system of claim 1, wherein the processor is further configured to determine an upcoming usage data based at least in part on the time series of the past usage data at a regular interval.

12. The system of claim 11, wherein the regular interval comprises once a month, once a week, once a day, or once an hour.

13. A method for provisioning resources, comprising:
  receiving a time series of past usage data, wherein the past usage data comprises process usage data and instance usage data;
  determining, using a processor, an upcoming usage data based at least in part on the time series of the past usage data; and
  provisioning a computing system according to the upcoming usage data, wherein provisioning the computing system according to the upcoming usage data comprises loading a set of data instances onto the computing system.

14. A computer program product for provisioning resources, the computer program product being embodied in a non-transitory computer readable storage medium and comprising computer instructions for:
  receiving a time series of past usage data, wherein the past usage data comprises process usage data and instance usage data;
  determining an upcoming usage data based at least in part on the time series of the past usage data; and
  provisioning a computing system according to the upcoming usage data, wherein provisioning the computing system according to the upcoming usage data comprises loading a set of data instances onto the computing system.

15. A system for provisioning resources, comprising:
  a processor; and
  a memory coupled with the processor, wherein the memory is configured to provide the processor with instructions which when executed cause the processor to:
    receive a time series of past usage data, wherein the past usage data comprises process usage data and instance usage data;
    determine an upcoming usage data based at least in part on the time series of the past usage data, wherein the upcoming usage data comprises a set of jobs at each of a set of times; and
    provision a computing system according to the upcoming usage data.

16. A method for provisioning resources, comprising:
  receiving a time series of past usage data, wherein the past usage data comprises process usage data and instance usage data;
  determining, using a processor, an upcoming usage data based at least in part on the time series of the past usage data, wherein the upcoming usage data comprises a set of jobs at each of a set of times; and
  provisioning a computing system according to the upcoming usage data.

17. A computer program product for provisioning resources, the computer program product being embodied in a non-transitory computer readable storage medium and comprising computer instructions for:
  receiving a time series of past usage data, wherein the past usage data comprises process usage data and instance usage data;
  determining an upcoming usage data based at least in part on the time series of the past usage data, wherein the upcoming usage data comprises a set of jobs at each of a set of times; and
  provisioning a computing system according to the upcoming usage data.

* * * * *